United States Patent [19]
Brandt et al.

[11] Patent Number: 6,144,990
[45] Date of Patent: *Nov. 7, 2000

[54] COMPUTER APPARATUS AND METHOD FOR COMMUNICATING BETWEEN SOFTWARE APPLICATIONS AND COMPUTERS ON THE WORLD-WIDE WEB USING UNIVERSAL VARIABLE HANDLING

[75] Inventors: Marcia Lynn Brandt, Rochester; Pernell James Dykes, Byron; Erik Duane Lindberg, Rochester, all of Minn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/780,014

[22] Filed: Dec. 23, 1996

[51] Int. Cl.⁷ .............................. G06F 15/16; G06F 17/30; G06F 17/60

[52] U.S. Cl. .......................... 709/203; 709/201; 709/202; 709/229; 705/8; 707/10

[58] Field of Search ......................... 395/200.49, 200.48, 395/200.47, 200.57, 200.33, 200.59; 709/201, 202, 203, 229; 705/8; 707/10

[56] References Cited

U.S. PATENT DOCUMENTS

| | | | |
|---|---|---|---|
| 5,742,845 | 4/1998 | Wagner | 395/200.33 |
| 5,754,772 | 5/1998 | Leaf | 395/200.33 |
| 5,754,774 | 5/1998 | Bittinger et al. | 395/200.33 |
| 5,761,656 | 6/1998 | Ben-Shachar | 707/4 |
| 5,778,367 | 7/1998 | Wesinger et al. | 395/200.33 |
| 5,781,739 | 7/1998 | Bach et al. | 395/200.57 |
| 5,784,562 | 7/1998 | Diener | 395/200.33 |
| 5,787,450 | 7/1998 | Diedrich et al. | 707/513 |
| 5,802,518 | 9/1998 | Karaev et al. | 395/200.59 |
| 5,826,239 | 10/1998 | Du et al. | 705/8 |
| 5,859,971 | 1/1999 | Bittinger et al. | 709/203 |
| 5,859,972 | 1/1999 | Subramaniam et al. | 709/203 |
| 5,870,545 | 2/1999 | Davis et al. | 709/201 |
| 5,872,915 | 2/1999 | Dykes et al. | 395/188.01 |
| 5,892,905 | 4/1999 | Brandt et al. | 709/229 |
| 5,937,388 | 8/1999 | Davis et al. | 705/8 |
| 6,003,087 | 12/1999 | Housel, III et al. | 709/229 |
| 6,014,673 | 1/2000 | Davis et al. | 705/8 |

OTHER PUBLICATIONS

"IBM FlowMark 2.2", Expanding the Capabilities of Object Oriented Workflow, Marshak, Seybold Group's Workgroup Computing Report, vol,. 19, No. 7, 1996.

"The Dependency Manager: a base service for transactional workflow management", Gunthor, 1996 IEEE.

"Sonet Configuration Management with OpenPM", Du et al., Proceedings of the Twelfth International Conference on Data Engineering, 1996.

"Business Process Management with FlowMark", Leymann et al., Compcon Sring 1994, Digest of Papers, 1994 IEEE.

"Standardizing Agent Technology", Sankar et al., Standard-View, vol. 3, No. 3, Sep. 1995.

"Policy Resolution for Workflow Management Systems", Jablonski et al., 1995 IEEE.

Primary Examiner—Kevin J. Teska
Assistant Examiner—William D. Thomson
Attorney, Agent, or Firm—Schmeiser, Olsen & Watts; Steven W. Roth

[57] ABSTRACT

According to the preferred embodiment, a computer system and method for providing access to a software application from a web browser over the WWW is disclosed. The system includes one or more computers executing a web browser, a web server application, an application gateway, and a software application. The system and method allows a user of the web browser to access the software application. The user inputs data via the web browser, which is communicated to the web server application, which passes the input to a CGI module. Based upon the web browser input, the CGI selects an HTML template containing at least one variable. The variable is passed to an application gateway which requests a value for the variable from the software application. The value is passed back to the CGI and inserted into the HTML template in place of the variable. The completed HTML template is then sent back to the web browser. The application gateway comprises a web based interface to the software application in combination with templates that specify variables.

39 Claims, 10 Drawing Sheets

FIG. 8

```
<HTML>
<HEAD>
<TITLE> Application Interface </TITLE>
</HEAD>
<FORM ACTION="/cgi-prot/exmp5cgi.exe" METHOD="POST">

<BODY>
<H4> Select a process instance:</H4>
<TABLE BORDER=1>
<TR>
<TH COLSPAN=2> Name
<TH> Description
<TH> Status <!--"wf-cgi-rbegin"-->
<TR>
<TD ALIGN=CENTER VALIGN=MIDDLE><INPUT TYPE="radio" NAME="wf-api-inst" VALUE="wf-api-inst-id">
<TD> "wf-api-inst-name"
<TD NOWRAP> "wf-api-inst-descrip"
<TD> "wf-api-inst-state"
<!--"wf-cgi-rend"-->
</TABLE>

<HR>
<H4>Next, select which action you want to Perform</H4>
<P><INPUT TYPE="radio" NAME=wf-cgi-submit" VALUE="5" > Start
<INPUT TYPE="radio" NAME=wf-cgi-submit" VALUE="6">Terminate
<P><INPUT TYPE="radio" NAME=wf-cgi-submit" VALUE="7"> Delete
<INPUT TYPE="radio" NAME=wf-cgi-submit" VALUE="8">Restart
<P><INPUT TYPE="radio" NAME=wf-cgi-submit" VALUE="9">Suspend
<INPUT TYPE="radio" NAME=wf-cgi-submit" VALUE="11">Resume
<P><INPUT TYPE="radio" NAME=wf-cgi-submit" VALUE="7">Refresh List
<INPUT TYPE="submit" VALUE="Perform Action">
<INPUT TYPE="hidden" NAME="wf-cgi-html" VALUE="nexthtml.htm">
</FORM>
</BODYL
</HTML>
```

800

```
<HTML>
<HEAD>
<TITLE> Application Interface </TITLE>
</HEAD>

<FORM ACTION="/cgi-prot/exmp5cgi.exe" METHOD="POST">
<BODY>
<H4> Select a process instance:</H4>
<TABLE BORDER=1>
<TR>
<TH COLSPAN=2> Name
<TH> Description
<TH> Status <!--"wf-cgi-rbegin"-->
<TR>
<TD ALIGN=CENTER VALIGN=MIDDLE><INPUT TYPE="radio"
NAME="wf-api-inst" VALUE="788345">
<TD> "Add- Joe Smith"
<TD NOWRAP> "Add new employee"
<TD> "Running"

<TR>
<TD ALIGN=CENTER VALIGN=MIDDLE><INPUT TYPE="radio"
NAME="wf-api-inst" VALUE="788399">
<TD> "Eval- Mary Jones"
<TD NOWRAP> "Evaluation of employee"
<TD> "Suspend"

<TR>
<TD ALIGN=CENTER VALIGN=MIDDLE><INPUT TYPE="radio"
NAME="wf-api-inst" VALUE="788427">
<TD> "Add- John Brown"
<TD NOWRAP> "Add new employee"
<TD> "Ended"

<TR>
<TD ALIGN=CENTER VALIGN=MIDDLE><INPUT TYPE="radio"
NAME="wf-api-inst" VALUE="788346">
<TD> "Run Report"
<TD NOWRAP> "Create company reports"
<TD> "Running"

<!--"wf-cgi-rend"-->
</TABLE>

<HR>
<H4>Next, select which action you want to Perform</H4>
<P><INPUT TYPE="radio" NAME=wf-cgi-submit" VALUE="5" > Start
<INPUT TYPE="radio" NAME=wf-cgi-submit" VALUE="6">Terminate
<P><INPUT TYPE="radio" NAME=wf-cgi-submit" VALUE="7"> Delete
<INPUT TYPE="radio" NAME=wf-cgi-submit" VALUE="8">Restart
<P><INPUT TYPE="radio" NAME=wf-cgi-submit" VALUE="9">Suspend
<INPUT TYPE="radio" NAME=wf-cgi-submit" VALUE="11">Resume
<P><INPUT TYPE="radio" NAME=wf-cgi-submit" VALUE="7">Refresh
List
<INPUT TYPE="submit" VALUE="Perform Action">
<INPUT TYPE="hidden" NAME="wf-cgi-html" VALUE="'nexthtml.htm'">
</FORM>
</BODY
</HTML>
```

Interface Template

Application Interface

Select a process instance:

| | Name | Description | Status |
|---|---|---|---|
| ○ | Add- Joe Smith | Add new employee | Running |
| ● | Eval- Mary Jones | Evaluation of employee | Suspend |
| ○ | Add- John Brown | Add new employee | Ended |
| ○ | Run Report | Create company reports | Running |

Next, select which action you want to perform

○ Start    ○ Terminate    ○ Delete

○ Restart    ○ Suspend    ● Resume

○ Refresh List

Perform Action

COMPUTER APPARATUS AND METHOD FOR COMMUNICATING BETWEEN SOFTWARE APPLICATIONS AND COMPUTERS ON THE WORLD-WIDE WEB USING UNIVERSAL VARIABLE HANDLING

RELATED APPLICATION

This application is related to the following U.S. patent applications: "Computer Apparatus and Method for Communicating Between Software Applications and Computers on the World-Wide Web", Ser. No. 08/780,013, filed Dec. 23, 1996; "Computer Apparatus and Method for Providing Security Checking for Software Applications Accessed via the World-Wide Web", Ser. No. 08/772,737, filed Dec. 23, 1996; "Computer Apparatus and Method Including a Disconnect Mechanism for Communicating Between Software Applications and Computers on the World-Wide Web", Ser. No. 08/772,738, filed Dec. 23, 1996; and "Computer Apparatus and Method for Providing a Common User Interface for Software Applications Accessed via the World-Wide Web", Ser. No. 08/780,015, filed Dec. 23, 1996.

BACKGROUND OF THE INVENTION

1. Technical Field

This invention generally relates to interactions on the world-wide web, and more specifically relates to an apparatus and method that allows a web user to interact with a software application on another computer system that is accessible via the world-wide web.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML).

With the growing popularity of the Internet and the WWW, businesses have recognized that the Internet provides a new way to boost both sales and efficiency. If a user with a web browser can interact directly with a company's work flow software, the transaction will be simplified. However, allowing a work flow product to interact with web users would require creating custom web server/software application interface for each specific software application that is to be accessed via the WWW.

In particular, most traditional systems use Common Gateway Interface (CGI) modules or programs as an interface between web servers and other software applications. For example, a CGI module could provide a link between a web server and a calendar software application, allowing the web server, for example, to insert dynamic calendar information into the web pages it outputs to web browsers. Thus, CGIs allow web servers to distribute dynamic data from other software applications. Unfortunately, programming a CGI is a time consuming task given numerous specifications that a CGI should satisfy. Furthermore, a separate CGI is generally needed for each different software application to be interfaced with the web server. Additionally, different CGI's may be required to perform different functions, such as grant the different users different levels of access to the same software application data. In addition to be difficult to program, multiple CGI's running at one time on a web server can significantly degrade server performance.

The process of generating a custom interface with a specialized CGI is time consuming and expensive, and results in a proprietary interface that cannot be used for communicating with other software applications. Without improved methods of communicating between software applications and computers on the world-wide web, the time and effort required to interface between an Internet user and a software application will be excessively long and expensive.

DISCLOSURE OF INVENTION

According to the present invention, a computer system and method for providing access to a software application from a web browser over the WWW is disclosed. The system uses HTML templates with at least one variable to provide an interface between a software application and a web browser without the need for a custom interface and/or CGI program for each software application process. The system includes one or more computers executing a web browser, a web server application, an application gateway, and a software application. The system and method allows a user of the web browser to access the software application. The user inputs data via the web browser, which is communicated to the web server application, which passes the input to a CGI program. Based upon the web browser input, the CGI selects an HTML template containing at least one variable. The variable is passed to an application gateway which requests a value for the variable from the software application. The value is passed back to the CGI and inserted into the HTML template in place of the variable. The completed HTML template is then sent back to the web browser. The application gateway comprises a web based interface to the software application in combination with templates that specify variables. Thus, the system is able to provide an interface between a software application and a web browser without the need for a custom interface and CGI for each application process.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 8 illustrates a sample HTML template used to provide access to FlowMark;

FIG. 9 illustrates the sample HTML template of FIG. 8 with the variables filled with real data for each process instance of FlowMark; and FIG. 10 is a representative view of how a typical web browser displays the sample HTML template of FIG. 9.

BEST MODE FOR CARRYING OUT THE INVENTION

The present invention relates to transactions via the WWW. For those individuals who are not Internet or WWW experts, the Overview section below presents many of the concepts that will help to understand the invention.

OVERVIEW

Web Transactions

Figure 2:
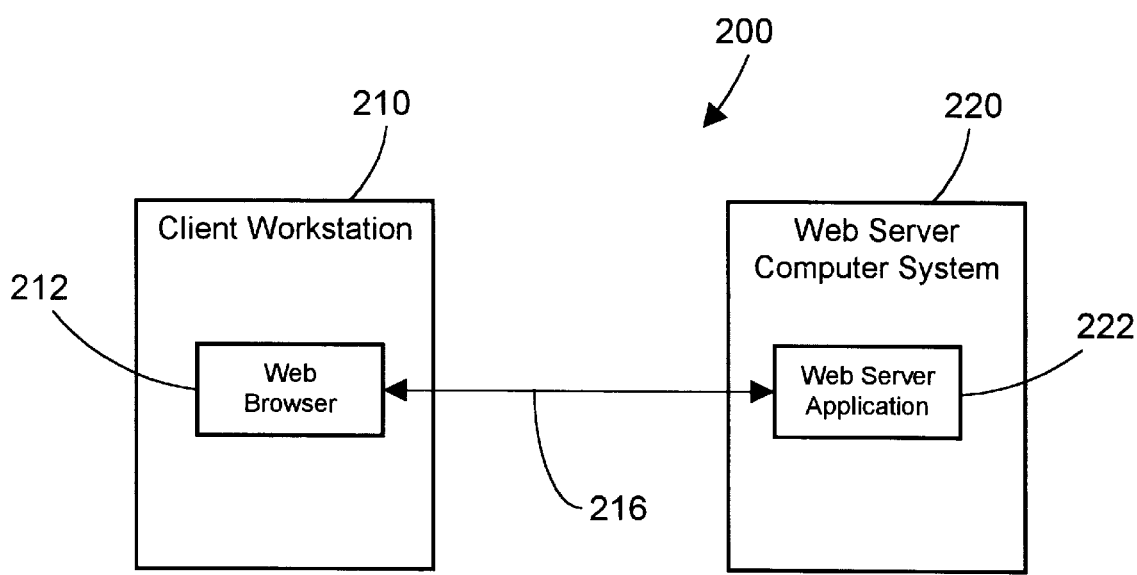
FIG. 2 is a block diagram of a transaction between a client workstation and a web server computer system.

Referring to FIG. 2, a typical transaction between a standard web browser 212 running on a client workstation 210 and a web server application 222 running on a web server computer system 220 occurs over a connection 216. Of course, client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 would include any web browser which is capable of transmitting and receiving data over the WWW. This includes commercial software applications such as IBM WebExplorer, Netscape Navigator, Microsoft Explorer, Apple Computer's CyberDog, and any other software application which now exists or which may be developed in the future for accessing or processing information over the WWW. The preferred embodiment for connection 216 is any suitable connection to the Internet, including a hardwired connection, telephone access via a modem or high-speed T1 line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of hypertext markup language (HTML) data to a user at client workstation 210. Other types of data (besides HTML) may also be transmitted to web browser 212, including text data, graphical data (e.g., .graphics image format (GIF) files), audio data (e.g., .WAV files), Java applets (executable code) and a specialized data form known as multipurpose internet mail extensions (MIME) data (which may include combinations of the foregoing and other data types).

Connection 216 may be any type of physical or logical means of connecting computer systems known in the art. This includes, but is not limited to, direct connections, Internet connection, Intranet connections, Infra Red (IR) and other forms of wireless connections. It is anticipated that many alternative methods and material for connecting computer systems will be readily adapted for use with the present invention. This would include those methods and materials to be developed in the future.

Web server application 222 is a software program running on web server computer system 220 that allows a user at client workstation 210 to access information controlled by web server 220. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 retrieves the output data (e.g., an HTML page) from within memory in web server computer system 220 or from other computer systems.

Web browser 212 typically interacts with web server application 222 by transmitting input (e.g., a Uniform Resource Locator (URL) or an HTML page) over connection 216 to web server computer system 220. Web server computer system 220 running web server application 222 receives the input from web browser 212, and in response, outputs data (e.g., an HTML page) to browser 212. The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in Hypertext Markup Language (HTML). HTML is a mark-up language that describes the structure of a web page in a standard way that web browsers are able to understand and interpret. When web server application 222 running on web server computer system 220 receives a web page request, it will retrieve a web page in HTML format and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

The remainder of this specification discloses how to use the invention to enable communication between a web user at client workstation 210 and a software application via the WWW, particularly in the context of work flow software.

DETAILED DESCRIPTION

Figure 1:
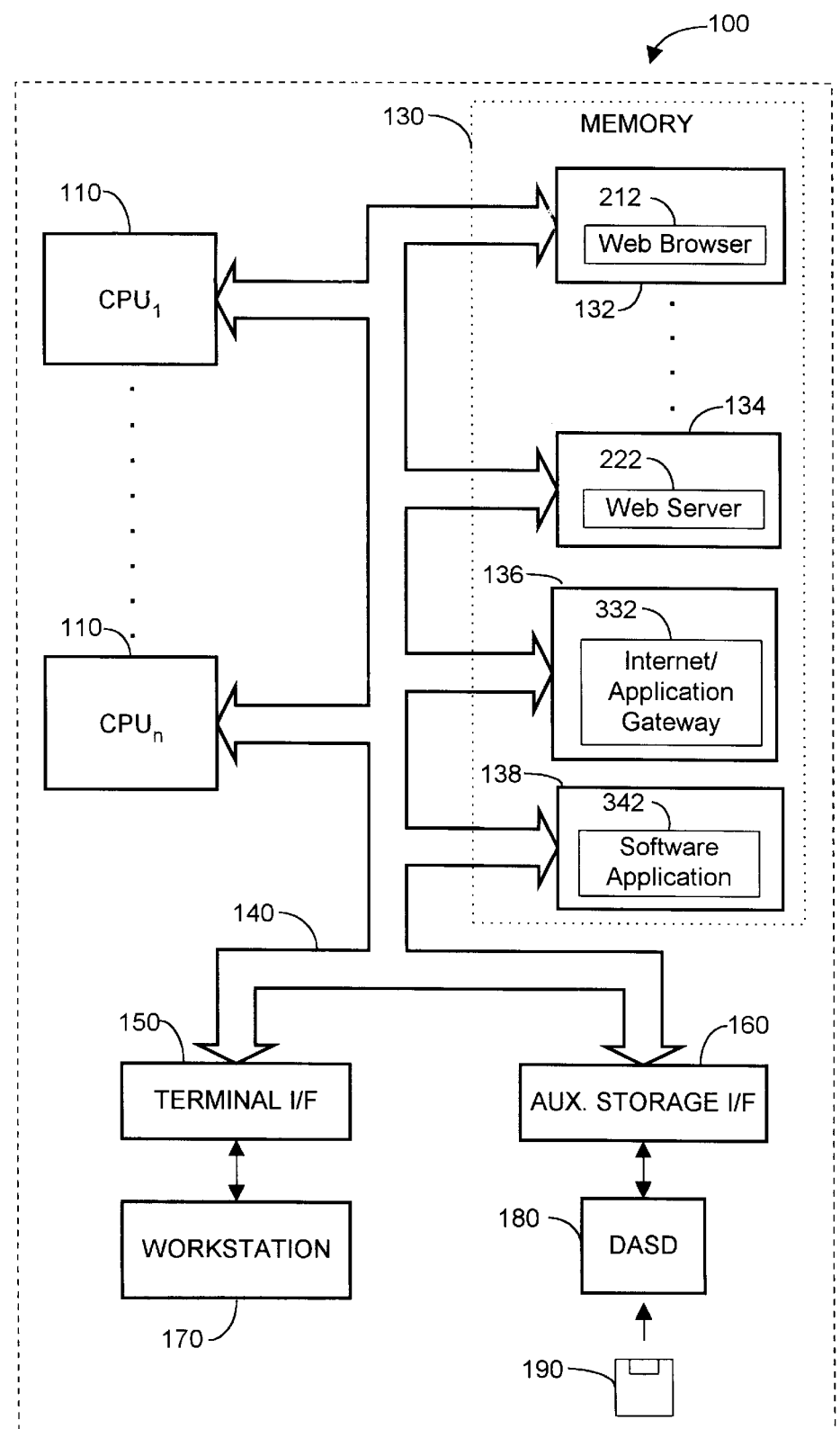
FIG. 1 is a block diagram of a preferred embodiment of the present invention.

Referring now to FIG. 1, a computer system in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 10 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with $CPU_1$, web server application 222 may reside on another computer system with a separate $CPU_2$, Internet/application gateway 332 may reside on a third computer system with a different $CPU_{n-1}$, and software application 342 may reside on a fourth computer with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

Figure 3:
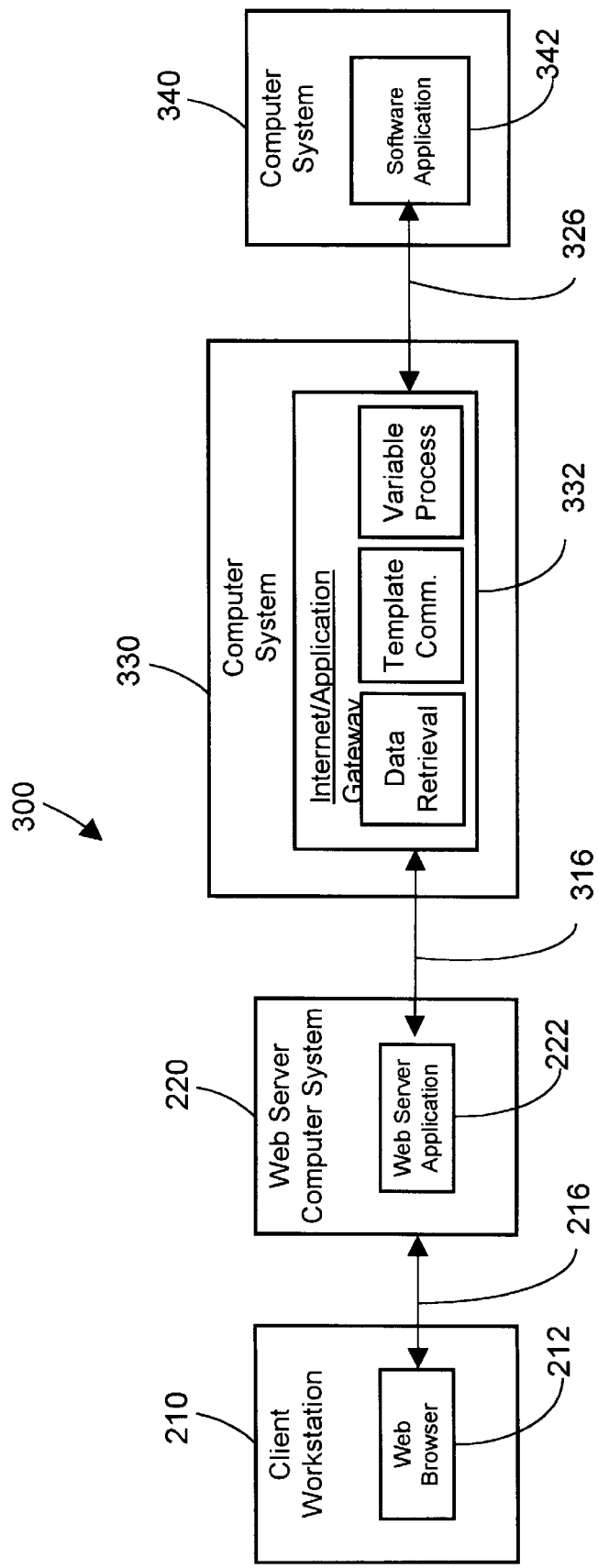
FIG. 3 is a block diagram of a system according to a preferred embodiment of the present invention that allows access to a software application over the World-Wide Web from a standard web browser.

Referring now to FIG. 3, a system 300 for accessing software application 342 via the WWW includes: web browser 212 running on client workstation 210; web server application 222 running on web server computer system 220; connection 216 connecting web browser 212 and web server application 222; an Internet/application gateway 332 running on a computer system 330, a connection 316 connecting web server application 222 and Internet/application gateway 332; a software application 342 running on a computer system 340; and a connection 326 connecting Internet/application gateway 332 and software application 342.

When a user wishes to access software application 342 or retrieve data under the control of software application 342, the user inputs a request from user workstation 210 by providing input to web browser 212. Web browser 212 communicates via connection 216 with web server application 222 which is running on web server computer system 220. Web server computer system 220 and client workstation 210 may or may not be co-located on the same physical computer hardware system. Web server application 222 will process the request from web browser 212 and, by examining the data stream received from web browser 212, recognize that the user needs to access Internet/application gateway 332. Web server application 222 will then communicate with Internet/application gateway 332 which resides on computer system 330 by using communication link 316. For the discussion herein, data flowing from web browser 212 to software application 342 is considered input data, while data flowing from software application 342 to web browser 212 is considered output data. Thus, data that web browser 212 outputs to web server application 222 is web browser input data (i.e., input data from web browser 212), even though web browser 212 is outputting this data to web server application 222.

Internet/application gateway 332 acts as a translator/facilitator to allow the request from the user to be processed by software application 342. Typically, this will involve translating URLs, HTML codes, or other user-driven commands into a format or language that can be understood and processed by software application 342. Internet/application gateway 332 may provide a transparent web client interface for the user. This means that the user is unaware that they are interacting with software application 342 through Internet/application gateway 332. The interface of web browser 212 need not disclose the source of the data that is being displayed on client workstation 210. The actual processing and communicating being done by Internet/application gateway 332 may be completely hidden from the user of web browser 212. A transparent user interface can thus be implemented by embedding codes and instructions on the appropriate HTML web pages that appear on client workstation 210.

Alternatively, Internet/Application Gateway 332 may provide a non-transparent web client for certain users. These users would be aware that their request is being handled by a different or remote system over the WWW. This may be the case for an in-house software user who has access to a software application that is running on a remote system.

After software application 342 has performed the task requested by the user via web browser 212, the appropriate status or data corresponding to the request is returned to Internet/application gateway 332 via connection 326. Internet/application gateway 332 in turn translates the requested data or status into a form that web server application 222 can understand and transmits the requested data or status to web server application 222 using connection 316. Upon receipt, web server application 222 outputs the requested status or data into a form appropriate for web browser 212. Web browser 212 can then display the appropriate output for client workstation 210. This format would include, once again, any type of data that web browser 112 is capable of understanding (i.e., MIME, JAVA, HTML, etc.).

In the past, methods used to access software applications through the WWW have required extensive programming to create customized interfaces (typically CGI modules or programs) between the web server 222 and the software application 342. Typically a different interface would be required for each software application to be accessed. In addition, a separate interface could be required to facilitate different users with different levels of access to the software application 342.

Internet/application gateway 332 acts as a universal common gateway interface (CGI) providing an interface between software application 342 and web server application 222 without the need for reprogramming of the internet/appliation gateway 332 for each separate software application 342. To faciliate the universal CGI ability, the internet/application gateway 332 preferably includes data a retrieval mechanism for retrieving data from the software application 342, a template communication mechanism for retrieving HTML templates from a library of templates, and a variable processing mechanism for processing variables and/or associated data. For example, the variable processing mechanism can pass a variable from a web browser input to an output sent back to the web browser 212. Furthermore, the variable processing mechanism can replace variables in templates with data retreived from the software application 342 for delivery to the web browser 212.

Internet/application gateway 332 and library of HTML templates provide a flexible and easily customizable way of providing access to multiple software applications, including software application 342 through a web browser 212 without requiring multiple CGI modules or programs. Thus, systems operators can create custom web interfaces to a wide variety of applications by use of appropriate templates without having to satisfy CGI programming requirements.

In the preferred embodiment, each of the HTML templates include one or more variables. When a submission is received from a web client that specifies a template, the internet/application gateway 332 opens the template. The internet/application gateway 332 than parses the template, locating the variables inside the template. Preferably, a portion of the variable name is used to identifies the corresponding software application that provides the variable value. The values for these variables are then requested from their associated software application. The software application 342 may simply retrieve data corresponding to the variables using the data retrieval mechanism, or may initiate software processes to generate the appropriate data. By inserting variables associated with more than one software application, a single web page can access data from these multiple software applications. The data is parsed into the HTML template by the gateway application and delivered to the web server, which delivers the output to the web browser. Thus, by using templates with properly defined variables, system operators can provide web based access to software application data without the difficultly of creating a custom interface.

In the preferred embodiment, the library of HTML templates include a wide variety of HTML pages that can be used by systems developers to provide web browser interaction with a software application. To achieve this end, the HTML templates preferably include various templates that employ different levels of HTML sophistication. For example, some templates could use advanced HTML tags such as those specified only in HTML version 3.2. The use of these advanced tags allows for sophisticated formatting but requires an advanced web browser. Thus, HTML templates containing these advanced tags can be used by systems developers that expect users to employ advanced web browsers to access the software application. Conversely, HTML templates could also be provided that adhere to earlier HTML versions, such as HTML 2.0, and as such would be accessible by a wide variety of less sophisticated web browsers. By providing a wide range of templates, the preferred embodiment gives system operators a wide flexibility in providing web interfaces to software applications.

The HTML templates of the preferred embodiment include input variables that are used to pass data from the web browser 212 to the software application and substitution variables that provide customized output from the software application 342. The variables are written into the HTML templates in such a way that they can be identified by the internet/application gateway 332. One such method involves writing the variables into HTML comments and using a application gateway that has the ability to parse variables located in the comments.

Input variables are inserted into HTML pages to provide input from the web browser 212 to the internet/application gateway 332 and software application 342. For example, an input variable can be included in an HTML page that specifies the next HTML page to be sent to the web browser 212. In that case, when the HTML page is submitted back to the web server 222, the internet/application gateway 332 parses out the variable and directs the web server 222 to deliver the specified HTML page back to web browser 212.

Additionally, the internet/application gateway 332 can be configured to pass a particular variable from one HTML screen to the next HTML screen. For example, a variable representing a particular communication instance can be inserted into subsequent HTML screens by the variable processing mechanisms to allow internet/application gateway 332 to track a particular users interaction with software application 342.

Substitution variables are variables included in the HTML templates and are used to communicate dynamic data back to the web browser. These variables are parsed from the HTML templates by internet/application gateway 332. Internet/application gateway 332 then requests the appropriate data for the substitution variables from software application 342. The software application 342 then locates the appropriate data represented by the substitution variables. This data can be generated by the software application 342 according to a predefined process or can be simply retrieved from the appropriate data storage.

User-defined variables can be added to HTML templates system operators to provide specialized inputs and outputs as needed for different types of software applications. These variables should be named in such a way that internet/application gateway 332 can determine which software application to pass the variable information to or retrieve the variable information from. Additionally, by adding a plurality of variables to an HTML template, inputs to a plurality of different software applications may be made from the submission of one template from web browser 212. Likewise, data can be retrieved from a plurality of software applications 342 and inserted into a single web page output to the web browser 216.

Figure 5:
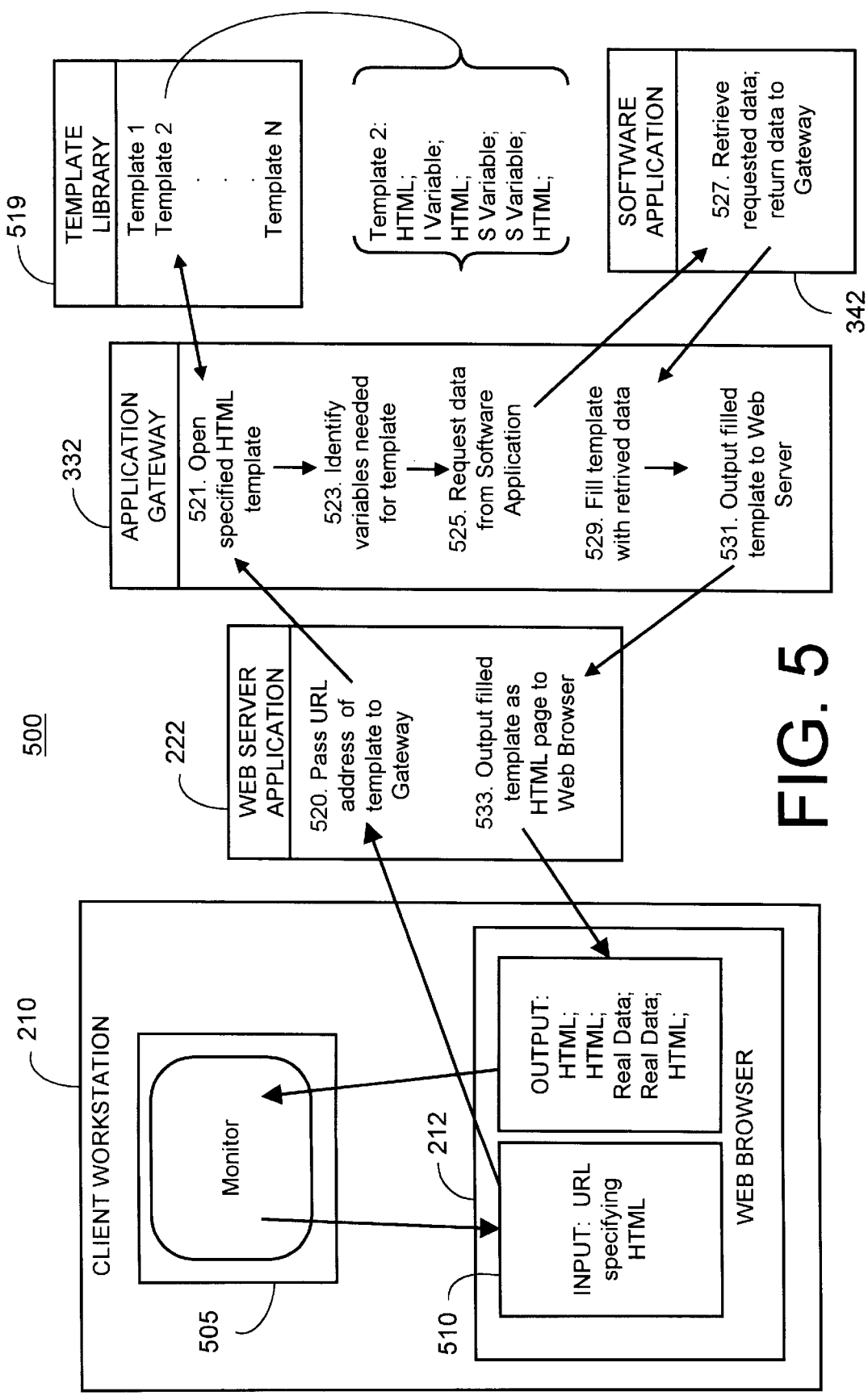
FIG. 5 is a process flow diagram of a method in accordance with a first preferred embodiment of the present invention that allows access to a software application over the World-Wide Web from a web browser.

Referring now to FIG. 5, a general method 500 of a preferred embodiment of the present invention to access software applications via the WWW may be described in conjunction with the system of FIG. 3. A user at client workstation 210 performs an action that causes web browser 212 to request access to a software application via the WWW by inputting data 510 to web server application 222. In this example the input data comprises an URL or other address type that specifies the location of an HTML template. Web browser 212 then uses standard communication protocols to pass web browser input data 510 to web server application 222 for processing. Web server application 222 processes the request and recognizes that the user has requested access to application gateway 332. Web server application 222 then passes the URL address of the specified template to the Gateway (step 520). Any communication 522 from web server application 222 to gateway 332 is referred to herein as web server input data. Gateway 332 then opens the specified HTML template that is located in a template library 519 using the template communication mechanism (step 521). Template library 519 is preferably with the Gateway 332 but can be located anywhere as long as it is accessible by Gateway 332. Template library 519 preferably contains a wide variety of HTML templates that a systems developer can use as examples in developing his own interface to the software application 342. In the illustrated example, the URL address specifies template 2 of the template library 519. Gateway 332 then identifies the variables stored in template 2. (step 523) Gateway 332 generates the appropriate commands that the software application 342 can understand and communicates the commands to software application 342. Any communication from gateway 332 to software application 342 is referred to herein as software application input data 532. Gateway 332 then requests the data needed for each substitution variable from software application 342 (step 525). Software application 342 then processes the request for input data (step 527). In processing the request for input data, software application may initiate software process to generate the data, call other programs that have the data, or retrieve data for local and/or networked data storage. Software application 342 then returns the requested data to gateway 332 (step 527). Any communication from software application 342 to gateway 332 is referred to herein as software application output data. Gateway 332 then substitutes the variables in the HTML template with the data retrieved from software application 342 (step 529). Gateway 332 then outputs the HTML template to web server 222 with the real data substituted for the substitution variables (step 531). This and any other communication from gateway 332 to web server application 222 is referred to herein as web server output data. Web server application 222 then provides the web server output data to web browser 212 (step 533). Any communication between web server application 222 and web browser 212 is referred to herein as web browser output data. Finally, web browser 212 provides web browser output data to the user in the appropriate form (e.g., displays an HTML page with the substituted real data on workstation monitor 505).

Note that the connections shown in FIG. 5 are representative of different types of data flow, and do not represent physical connections. For example, web browser input data and web browser output data of FIG. 5 are both communicated via connection 216 of FIG. 3. Web server input data and web server output data are both communicated via connection 316 of FIG. 3. Software application input data and software application output data are both communicated via connection 326 of FIG. 3. Note that connections 216, 316 and 326 may be any suitable connection between computer systems and/or software applications.

Figure 6:
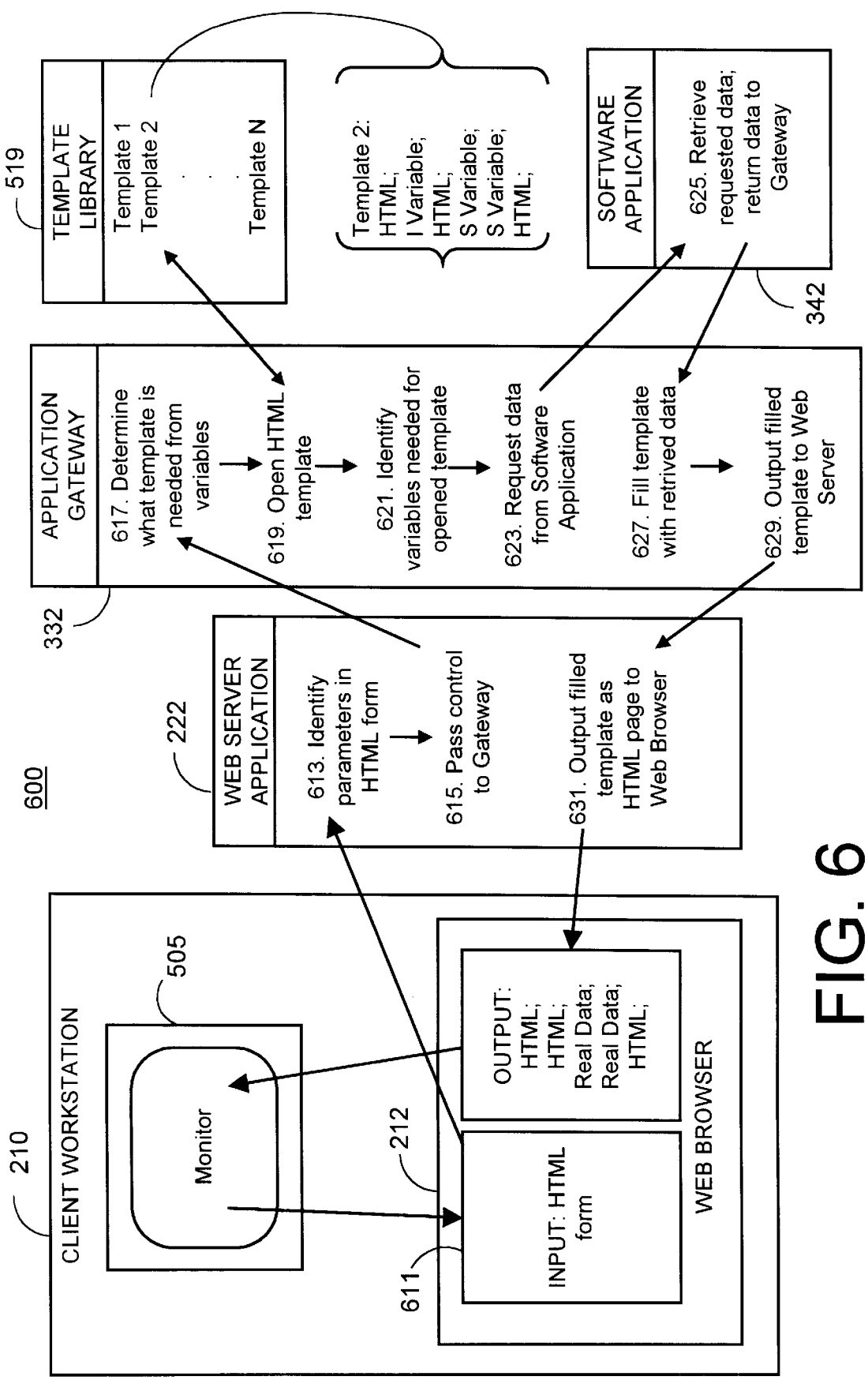
FIG. 6 is a second process flow diagram of a method in accordance with a second preferred embodiment of the present invention adapted for accessing a software application over the World-Wide Web.

Referring now to FIG. 6, a second general method 600 of a preferred embodiment of the present invention to access software applications via the may be described in conjunction with the system of FIG. 3. A user at client workstation 210 performs an action that causes web browser 212 to request access to a software application via the WWW by inputting data to web server application 222. In this example, the input data comprises an HTML form 611 that contains various types of variables. In particular HTML form 611 can contain both input and substitution type variables. Web browser 212 then uses standard communication protocols to pass the HTML form 611 to web server application 222 for processing. Web server application 222 identifies parameters in the HTML form (step 613) that require services of application gateway 332, passes control to application gateway 332 (step 615). Application gateway 332 then parses the variables from the HTML form (step 616). Any communication 522 from web server application 222 to gateway 332 is referred to herein as web server input data.

From the variables sent by web server application 222, Gateway 332 determines what template is needed from the library of templates 519 (step 617). Again, template library 519 is normally stored with the Gateway 332 but can be located anywhere as long as it is accessible by Gateway 332. Template library preferably contains a wide variety of HTML templates to create a flexible web interface with software application 342. In the illustrated example, Gateway 332 determines from the variables that template 2 is the template needed to respond to the web browser input. Gateway 332 then opens the needed template (step 619) and identifies what variables in the template are needed to be filled by substitution data before sending the template to web browser 212 (step 621). Gateway 332 then requests the data needed for each substitution variable from software application 342 (step 623). Again, this and any other communication from gateway 332 to software application 342 is referred to herein as software application input data 532. Software application 342 then processes the request for input data (step 625). In processing the request for input data, software application may initiate software process to generate the data, call other programs that have the data, or retrieve data for local and/or networked data storage. Software application 342 then returns the requested data to gateway 332 (step 625). Any communication from software application 342 to gateway 332 is referred to herein as software application output data. Gateway 332 then substitutes the variables in the HTML template with the data retrieved from software application 342 (step 627). Gateway 332 then outputs the HTML template with substitution data inserted in the HTML page that is output to web server 222 (step 629). This and any other communication from gateway 332 to web server application 222 is referred to herein as web server output data. Web server application 222 then provides the web server output data to web browser 212 (step 631). Any communication between web server application 222 and web browser 212 is referred to herein as web browser output data. Finally, web browser 212 provides web browser output data to the user in the appropriate form (e.g., displays an HTML page with the substituted real data on workstation monitor 505).

FIG. 5 and FIG. 6 depict a preferred embodiment of a method in accordance with the present invention and describes the interaction and communication between a single web browser and a software application. However, the present invention is not limited to an environment with a single user and a single web browser. As explained below with regard to FIG. 7, a multi-user system is contemplated where multiple users will use multiple web browsers to simultaneously access the same software application via the WWW. The Internet/application gateway 332 provides a mechanism to track interactions between multiple users and match substitution data from the software application according to the templates requested for each of the multiple users for the various desired transactions.

Figure 4:
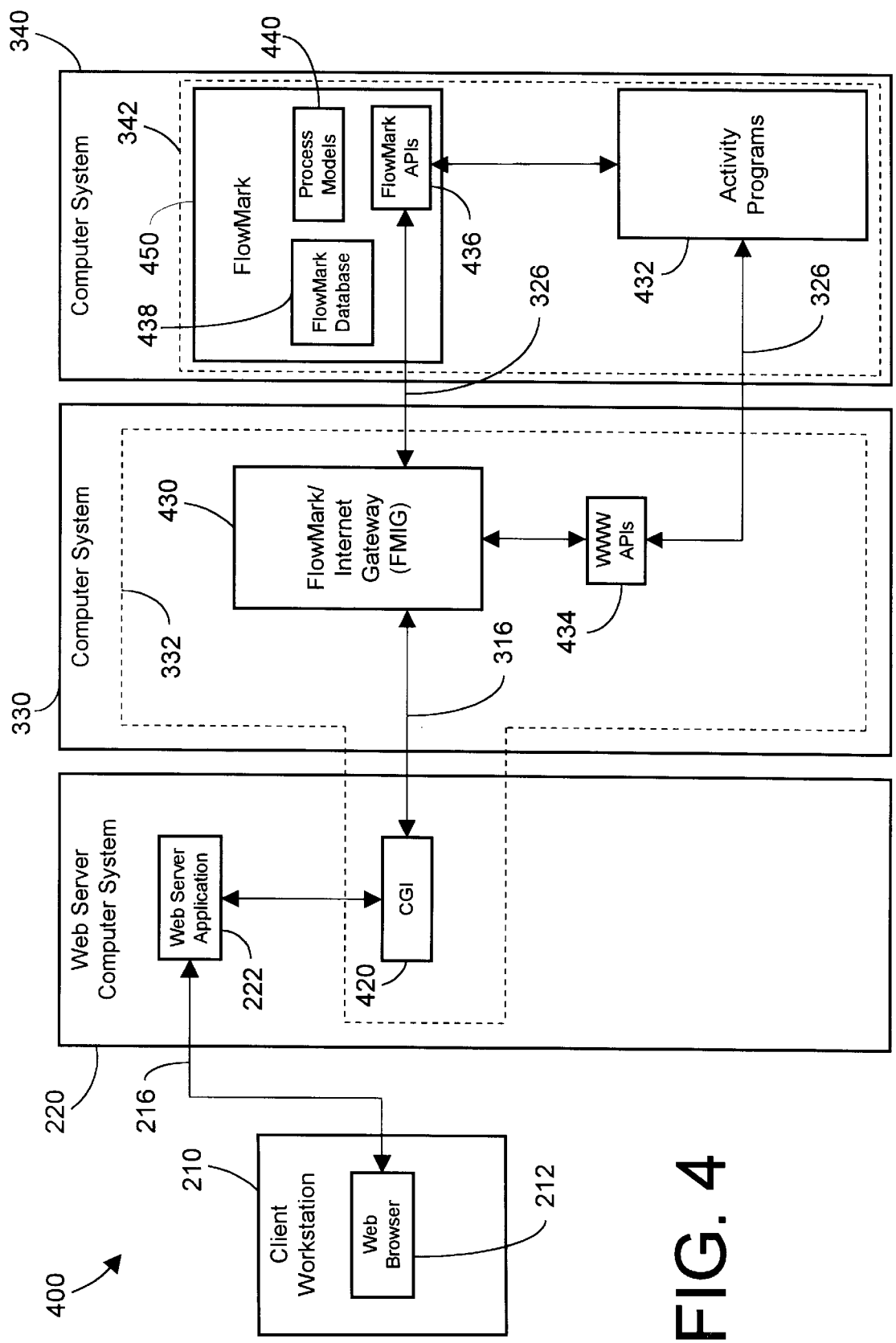
FIG. 4 is a more detailed block diagram of the system of FIG. 3, further adapted to access FlowMark workflow application software over the World-Wide Web.

Referring now to FIG. 4, a system 400 allows accessing a FlowMark workflow system over the WWW from web browser 212. In this example, software application 342 is a workflow application known as FlowMark which is programmed to perform a specific function. While this specific example uses FlowMark to describe the invention, the present invention is not limited to FlowMark. Other software applications may be used in conjunction with the present invention and it is anticipated that additional application software packages will be so used.

FlowMark is a popular process engineering tool that allows a relatively complex project or task to be broken down into a series of smaller processes or tasks. The activity to be executed by FlowMark is described by using one or more process models 440 that describe the process flow and activity. This makes FlowMark very useful for activities and transactions that can be accomplished by computer systems over communication networks. FlowMark is used to build process models 440 which describe the real life task as a series of computerized sequences. Information is processed by the FlowMark workflow software and usually involves multiple related activities. The FlowMark workflow process language models the activity and automates transactions where appropriate. Individual tasks are generated into "work lists" (i.e., electronic "to do" lists). One example of using FlowMark to accomplish a specific task will be presented in detail below.

System 400 of FIG. 4 represents one suitable detailed implementation of system 300 shown in FIG. 3. The same computer systems are present (i.e., 210, 220, 230, and 240), with web browser 212 and web server application 222 residing on client workstation 210 and web server computer system 220, respectively. System 400 of FIG. 4 is presented herein to show one specific implementation of Internet/application gateway 332 when used to communicate with FlowMark workflow software application 342.

For this specific implementation, Internet/application gateway 332 includes a Common Gateway Interface (CGI) 420, a FlowMark/internet Gateway (FMIG) 430 and WWW Application Program Interfaces (APIs) 434. FlowMark application software 342 includes FlowMark 450, and one or more activity programs 432. FlowMark 450 includes a database 438, one or more process models 440, and FlowMark APIs 436. A specific software application 342 is implemented in system 400 by defining a process model 440 within FlowMark, and by defining activity programs 432 that perform specific tasks within process model 440. FlowMark Application Program Interfaces (APIs) 436 are standard APIs that are supplied with FlowMark 450 and provide a way for FlowMark 450 to communicate with activity programs 432 and FMIG 430. FlowMark database 438 is a general purpose database that may be used to store information relating to any process model. For example, if a process model 440 and activity programs 432 implement a rental car work flow process, FlowMark database 438 would be used to store information relating to the rental car process, such as which cars are available, etc.

The user who needs to access a FlowMark application 342 over the WWW will input a request to web browser 212 using client workstation 210. The user can enter a URL for a specific home page site or click on a button presented in an HTML-generated user interface using web browser 212. When the user "submits" the requested information, usually by clicking on a button presented on an HTML form, web server application 222 receives input data from web browser 212. This data stream may be presented to web server application 222 in many different formats, including RFC 1866 or RFC 1867 formats. These two specific formats are just examples of common data stream formats that common web browsers understand. The present invention is not limited to these formats but includes any data transmission format now known or developed in the future.

Web server application 222 will examine the user's data stream to determine what action should be taken to fulfill the user's request. For this specific example, the command is a call to CGI 420. The call to CGI 420 may be part of the URL or, alternatively, may be embedded in the data submitted by web browser 212. Access to CGI is protected to keep unauthorized users from accessing FlowMark application 342 via the WWW. In order to gain access to CGI 420, the user must be authenticated by web server application 222. When web server application 222 sees the CGI command in the data stream generated by web browser 212, it requests a password and user identification (userID) from the user via web browser application 222. After the user has been authenticated, web browser application 222 p ass es control to CGI 420 to perform the needed operation(s).

CGIs are executable programs that are well known to those skilled in the art. CGIs function to provide a mechanism for transmitting information across the WWW. CGI 420 passes information from web server application 222 to FMIG 430 in the form of commands. The commands are one-way, i.e., from CGI 420 to FMIG 430, but data and status pass in both directions. Web server application 222 invokes CGI 420, and sends the appropriate commands and data regarding the request. Although the current preferred embodiment of the invention uses the "standard in" (stdin) format for data transmission from web browser 212 to CGI 420, any other data transmission formats that may be generated by web browser 212 are contemplated and are within the scope of this invention.

After receiving the data from web browser 212, CGI 420 parses the data to locate relevant information about the requested processes, including the request for access to FlowMark 342. CGI 420 then sends the user data and requests to FMIG 430 along with some control information. FMIG 430 provides a way for FlowMark application 342 to interact with a web user over the WWW. FMIG 430 directs the flow of information between CGI 420 and FlowMark application 342 and initiates FlowMark functions by using FlowMark APIs 436. For example, FMIG 430 may invoke a FlowMark API 436 to create a process instance necessary to process the request submitted by the user. Then, using a different FlowMark API 436, FMIG 430 can invoke or start this process instance. The process is governed by a process model 440, which tells FlowMark 450 which activity program 432 must be invoked to perform the desired task. Once FMIG 430 has started a FlowMark process, it waits until it receives information from FlowMark 450 via FlowMark APIs 436 or from activity programs 432 via WWW APIs 434 that the request has been processed. The command interface between FMIG 430 and FlowMark APIs 436 is one-way, i.e., FMIG 430 always invokes FlowMark APIs 436, but the data and status information flows in both directions. This is important because it allows the interface to FlowMark application 342 to remain unchanged even if the web interface is changed.

WWW API's 434 comprise the necessary programming API's to facilitate communication between FMIG 430 and activity programs 432. As such, the WWW API's 434 preferably include an OPEN, CLOSE, RECEIVE and SEND APIs. These APIs provide the basic communication interfaced needed to allow activity programs 432 to communicate with web browser 212 through FMIG 430. A conversation is generally commenced by invoking an OPEN application program interface (API), and is generally closed by invoking a CLOSE API. The OPEN API creates a "conversation identifier" that used to uniquely mark or tag all conversations between a specific web browser and FlowMark until the conversation is closed by use of the CLOSE API. FMIG 430 uses the conversation identifier to keep track of individual requests because FMIG 430 may be working with multiple users and multiple requests from each of those users. FMIG 430 thus maintains the information necessary to control the flow of information between the various users and the process instances being processed by FlowMark.

Activity programs 432 are software modules which can be used by FlowMark to accomplish the tasks requested by the user. Individual activity programs 432 are initiated by FlowMark and then the Activity Program 432 communicates with the web client via WWW APIs 434. Each workflow process model 440 initiates the activity programs 432 necessary to accomplish the designated task. Each activity program 432 is an instance of a program that runs to accomplish the desired task, returns the requested information, and then terminates. For example, activity programs 432 may require information from the user in order to process the user's request. Activity program 432 invokes appropriate WWW APIs 434 to obtain the necessary data. In this case, FMIG 430 has data waiting to submit to activity program 432, which is the same data that CGI 420 sent earlier in the process. FMIG 430 sends this data through WWW API 434 to activity programs 432. Activity programs 432 take the appropriate steps to process the data and fill the request. Activity programs 432 communicate with the user through WWW APIs 434, FMIG 430, CGI 420 and web server application 222. Activity programs 432 will also issue commands to ensure that the user has received the requested data. After confirmation has been received, that specific instance of activity programs 432 is finished with that request and will terminate. Other instances of one or more activity programs 432 may still be active, processing other requests.

WWW APIs 434 serve to provide interaction between FMIG 430 and activity programs 432. WWW APIs 434 allow FlowMark activity programs 432 to send and receive data and status to and from web clients. It is important to note the FlowMark APIs 436 remain unchanged. This is important because FlowMark APIs are not modified to allow a web user to access FlowMark. In this sense, FlowMark is unaware that a web client is accessing it, and FlowMark operates in the same manner it would as if a dedicated application were performing the requested functions. Since the FlowMark APIs are not affected, the operation of FlowMark will remain stable regardless of the process or task the web client is requesting that FlowMark application 342 accomplish. Multiple users from multiple locations can access FlowMark via the WWW and be assured that the FlowMark interface will remain stable. In some cases, the system will present a transparent web client, which means that there will be no indication to the user that their request is being processed by FlowMark application 342.

Computer System 330 and Computer System 340 are the same computer system in the preferred embodiment. Connections 216, 316, and 326 may be any type of physical or logical means of connecting computer systems known in the art. This includes, but is not limited to, direct connections, Internet connections, Intranet connections, Infra Red (IR) and other forms of wireless connections. It is anticipated that many alternative methods and material for connecting computer systems will be readily adapted for use with the present invention. In sum, while several separate computer systems are disclosed herein (e.g., FIGS. 3 and 4), a computer system in accordance with the present invention may include any number or combination of computer systems. The figures herein are shown to illustrate salient aspects of the invention, and should not be construed to limit the invention to the particular configurations illustrated herein.

Referring now to FIG. 8, FIG. 8 illustrates a sample HTML template 800 used to provide access to FlowMark as illustrated by FIG. 4. Assume that the web server 222 receives an input from web browser 212 specifying that CGI 420 should be invoked with the template of FIG. 8 specified as a parameter. The parameter indicates the next output that needs to be sent back to web browser 212. This specifying can be done in various ways, including the use of form inputs from the web browser 212.

CGI 420 will retrieve the specified template 800, parse the template for HTML variables, and pass the parsed variables together with the environment data and control information to FMIG 430. In the template 800 the substitution variables include "wf-api-inst-id", "wf-api-inst-name", "wf-api-inst-descrip" and "wf-api-inst-state". The <! --wf-cgi-rbegin-- > and <! --wf-cgi-rend-- > tell CGI 420 to repeat the HTML and perform variable substition for each process instance FMIG 430 returns.

FMIG 430 then requests from FlowMark the values corresponding to each of the above substitution variables. In particular, FMIG 430 uses FlowMark APIs 436 to retrieve the data corresponding to each variable for each process instance. This can include prompting FlowMark to begin processes used to generate the variable values or instructing FlowMark in the location of the variables. When FMIG 430 receives the variable data it delivers the data to CGI 420 which is still connected and waiting for data from FMIG 430. Once the data has been transmitted to CGI 420, CGI 420 disconnects from FMIG 430 and begins to process the received data. CGI 420 will take the information from FMIG 430 and process the variables, putting the information into the appropriate template that will be displayed on client workstation 210. An example of the HTML template with the variables filled with real data for each process instance is illustrated in FIG. 9 as HTML code 900.

The HTML code 900 is delivered to the web browser 212 and displayed. An example of how a typical web browser would display HTML code 900 is illustrated by sample web page 910 of FIG. 10. In particular, the typical web browser reads the HTML and creates a web page 910 that conforms the various HTML tags.

When the user views web page 910 they are instructed to select a instance an action to perform on the process instance. By selecting the appropriate input radio button and submitting the web page 910 back to the web server 222 the user can control the actions of FlowMark. In particular, by selecting the "Eval-Mary Jones" and "Resume" buttons and pressing the submit button the web browser sends the input variables back to the web server 222. The web server 222 parses the input variables, "wf-api-inst" with a selected value of 788399 and "wf-cgi-submit" with a value of 11. Web server application 222 invokes CGI 420 with HTML code similar to that used before; <FORM ACTION="/cgi-prot/exmp5cgi.exe" METHOD="POST"> and delivers the input variable values to the CGI 420 as post data. In the illustrated example, the web server application 222 passes the post data "wf-api-inst=788399&wf-cg-isubmit=11&wf-cgi-html=nexthtml.htm" to CGI 420.

The CGI 420 delivers the input variable values to the FMIG 430 which initiates the resumption of the Mary Jones evaluation process instance of FlowMark.

Multiple variables in a single HTML template can be used to retrieve data from multiple applications. For example, an HTML template could be specified that includes three variables. One variable could specify a particular FlowMark process that is to be started while the other two variables are used to retrieve information from different software applications that are accessible by a FlowMark activity program. Upon submission of the HTML template to web server 222, the CGI parses the variables and delivers them to the FMIG. The FMIG then directs the software application to start the process specified by the wf variable and passes the two application variables to the appropriate software application. The software application would then retrieve the appropriate data from the applications corresponding to the variables. Thus, by using the appropriate HTML variables a web client is able to work with many different applications through a single web page. This interaction can be completely transparent to the web client or may be apparent from the interface web page.

Thus, by using HTML templates with substitution variables, a single relatively simple CGI module in conjunction with an FMIG can provide an effective interface between a web server and a plurality of software applications. This allows system operators provide easily customizable web access to a plurality of software applications over the WWW without having to use multiple or excessively complex CGI modules.

Figure 7:
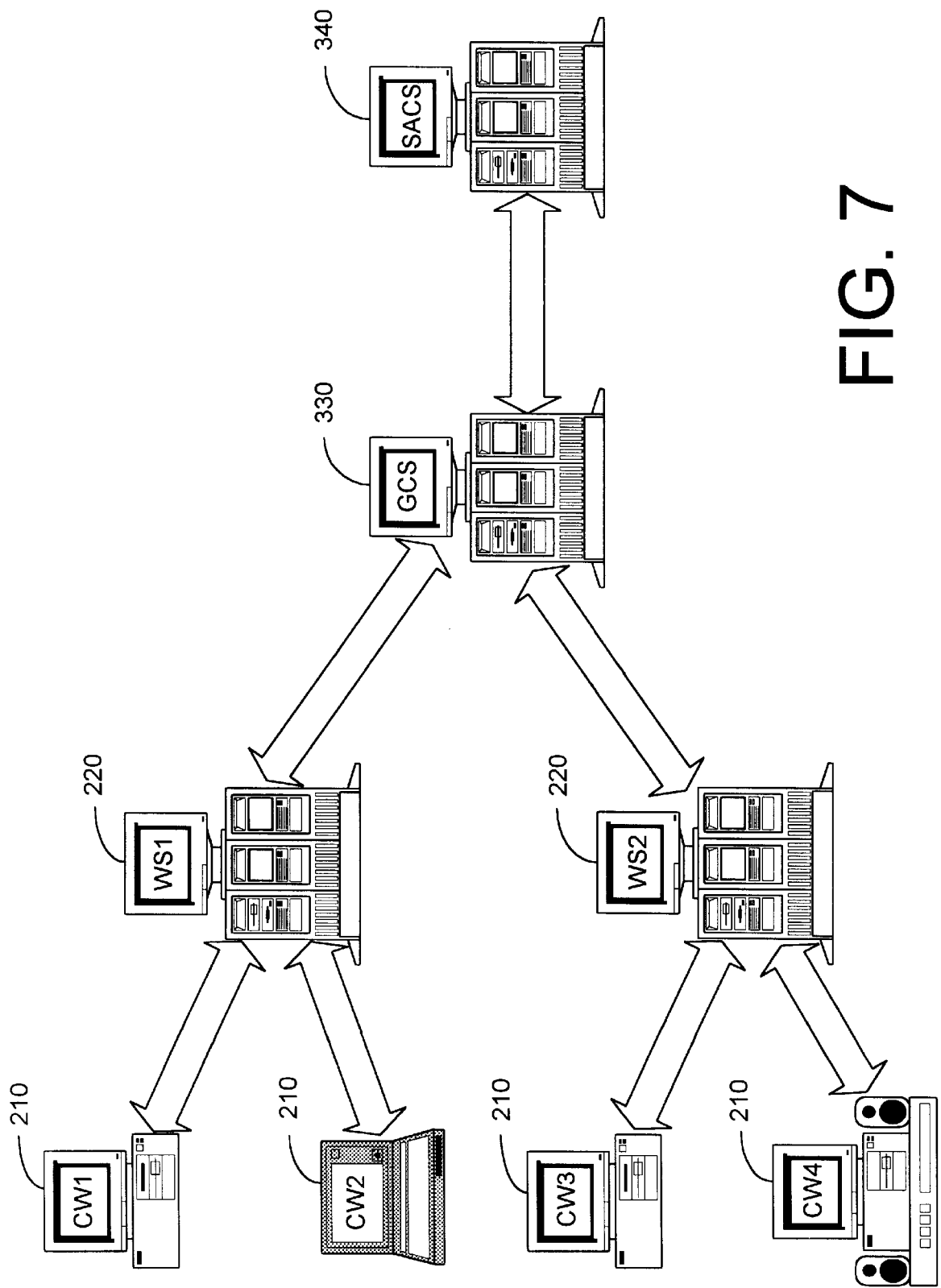
FIG. 7 is a block diagram of a preferred embodiment of the present invention when expanded to a multi-user environment.

Referring now to FIG. 7, advantages of the present invention become most apparent when multiple users are trying to access a one or more software application simultaneously via web browsers on the WWW. Each web user will generally have a client workstation 210 that will be used to access the WWW. For the specific configuration of FIG. 7, client workstations 1 and 2 (CW1 and CW2) are coupled to web server 1 (WS1), and client workstations 3 and 4 (CW3 and CW4) are coupled to web server 2 (WS2). Both web servers WS1 and WS2 are coupled to a gateway computer system GCS. Gateway computer system is coupled to a software application computer system (SACS) that is running the software application that web users need to access via the WWW.

The present invention manages all the accesses by all these client workstations (CW1–CW4) to application software running on SACS in a manner that assures that the requested functions are performed as requested. The gateway computer system provides the application gateway that directs traffic between the web clients and the software application. By assigning unique identifiers to each conversation between a web client and the application software, the gateway computer system can interact with the software application using its native interface, and can then identify output from the software application and match it with the web client that started the process that resulted in the output being generated.

While the invention has been particularly shown and described with reference to preferred embodiments thereof, it will be understood by those skilled in the art that various changes in form and details may be made therein without departing from the spirit and scope of the invention.

What is claimed is:

1. A computer system for communicating between a web browser and a plurality of software applications over the World-Wide Web, at least one of the plurality of software applications being a workflow management software application, said computer system comprising:

a) at least one CPU;

b) at least one memory coupled to the at least one CPU;

c) a gateway mechanism residing in the memory and being executed by the at least one CPU, the gateway mechanism capable of retrieving at least one of a plurality of data values from each of the plurality of software applications, and inserting the plurality of data values into a single web page output to the web browser, the gateway mechanism receives an input from the web browser and parses at least one input variable from the web browser input, and wherein the gateway mechanism further includes:

a template communication mechanism, wherein the template communication mechanism retrieves a template corresponding to the at least one variable, the retrieved template including a plurality of substitution variables;

a data retrieval mechanism, wherein the data retrieval mechanism retrieves at least one of a plurality of data values from each of the plurality of software applications, each data value corresponding to one of the plurality of substitution variables in the retrieved template; and a variable processing mechanism, wherein the variable processing mechanism inserts the retrieved plurality of data values into the retrieved template and outputs the retrieved template with the retrieved plurality of data values to the web browser.

2. The computer system of claim 1 wherein the template is retrieved from a library containing a plurality HTML templates.

3. The computer system of claim 1 wherein the computer system further comprises a web server computer system running a web server application coupled to the web browser.

4. The computer system of claim 1 wherein the at least one input variable includes a software application identification mechanism.

5. The computer system of claim 2 wherein the plurality of templates each include hypertext markup language capable of being interpreted by the web browser.

6. The computer system of claim 1 wherein at least one of the plurality of software applications is a process engineering software application.

7. A computer implemented method for interfacing between a web browser and a plurality of software applications over the World-Wide Web, the method comprising the steps of:

providing an input from the web browser to a web server;

passing the input to a common gateway interface (CGI);

selecting an HTML template from one of a plurality of HTML templates, the selecting based upon the input from the web browser, each of the plurality of HTML templates including a plurality of substitution variables;

passing the plurality of substitution variables included in the selected HTML template to an application gateway;

retrieving from each of the plurality of software applications at least one value, each value corresponding to the one of the plurality of substitution variables and delivering the at least one value to the application gateway;

passing the at least one value to the CGI;

inserting each of the at least one value into the corresponding one of the plurality of substitution variables in the selected HTML template; and passing the selected HTML template with the inserted plurality of values to the web browser.

8. The method of claim 7 wherein the input from the web browser comprises a URL address specifying an HTML template and wherein the step of selecting a HTML template comprises selecting the URL.

9. The method of claim 7 wherein the input from the web browser comprises an URL that specifies the location of an HTML template, and wherein the step of selecting an HTML template comprises opening the HTML template that exists at the URL.

10. The method of claim 7 wherein at least one of the plurality of software applications is a process engineering software application.

11. The method of claim 7 wherein at least one of the plurality of software applications is a workflow management software application.

12. A computer system for communicating between a web browser and a plurality of software applications over the World-Wide Web comprising:

a) a plurality of CPUs;

b) at least one memory coupled to the plurality of CPUs;

c) a gateway mechanism residing in the at least one memory and being executed by at least one of the plurality of CPUs, the gateway mechanism capable of retrieving at least one of a plurality of data values from each of the plurality of software applications, and inserting the plurality of data values into a single web page output to the web browser, the gateway mechanism including:

a template communication mechanism, wherein the template communication mechanism retrieves a template corresponding to at least one input variable from the web browser, the retrieved template including a plurality of substitution variables;

a data retrieval mechanism, wherein the data retrieval mechanism retrieves at least one of a plurality of data values from each of the plurality of software applications, each data value corresponding to one of the plurality of substitution variables in the retrieved template; and a variable processing mechanism, wherein the variable processing mechanism inserts the retrieved plurality of data values into the retrieved template and outputs the retrieved template with the retrieved plurality of data values to the web browser.

13. The computer system of claim 12 wherein the template is retrieved from a library of HTML templates.

14. The computer system of claim 12 wherein;

the template is retrieved from a library comprising a plurality of HTML templates, each of the plurality of HTML templates providing an interface to the plurality of software applications, and including a plurality of substitution variables;

the data retrieval mechanism retrieves a data value for each of the plurality of substitution variables;

the variable processing mechanism inserts the data value for each of the plurality of substitution variables into the HTML template; and the gateway mechanism passes the HTML template to the web browser.

15. The computer system of claim 12 wherein the computer system further comprises a web server computer system running a web server application coupled to the web browser.

16. The computer system of claim 15 wherein the gateway mechanism includes a common gateway interface (CGI) providing an interface between the web server application and gateway mechanism.

17. The computer system of claim 12 wherein the input variable includes a software application identification mechanism.

18. The computer system of claim 12 wherein at least one of the plurality of software applications is a process engineering software application.

19. The computer system of claim 12 wherein at least one of the plurality of software applications is a workflow management software application.

20. The computer system of claim 12 wherein the web browser is executed on a client workstation by at least one of the plurality of CPUs.

21. The computer system of claim 12 wherein the application gateway is executed on a web server computer by at least one of the plurality of CPUs.

22. The computer system of claim 12 wherein the gateway mechanism is executed on a first computer by at least one of the plurality of CPUs.

23. The computer system of claim 12 wherein at least one of the plurality of software applications is executed on a second computer by at least one of the plurality of CPUs.

24. The computer system of claim 12 wherein the application gateway is executed on the second computer by at least one of the plurality of CPUs.

25. The computer system of claim 12 wherein the application gateway is executed on a first computer by at least one of the plurality of CPUs.

26. A program product for communicating between a plurality of web browsers and a plurality of software applications, the program product comprising:
  (1) an application gateway in communication with the plurality of web browsers and the plurality of software applications, the application gateway comprising:
    a template communication mechanism, the template communication mechanism providing an interface with a plurality of HTML templates, each of the plurality of HTML templates including at least one input variable and a plurality of substitution variables, the template communication mechanism retrieving one of the plurality of HTML templates;
    a data retrieval mechanism, wherein the data retrieval mechanism retrieves from the plurality of software applications data corresponding to the plurality of substitution variables in the retrieved HTML template; and
    a variable processing mechanism, wherein the variable processing mechanism processes the data retrieved from the plurality of software applications and substitutes the data into the plurality of substitution variables in the retrieved HTML template;
  (2) signal bearing media bearing the application gateway.

27. The program product of claim 26 wherein the signal bearing media comprises recordable media.

28. The program product of claim 26 wherein the signal bearing media comprises transmission media.

29. The program product of claim 26 wherein at least one of the plurality of software applications is a process engineering software application.

30. The program product of claim 26 wherein at least one of the plurality of software applications is a workflow management software application.

31. A computer-implemented method for communicating between a plurality of web browsers and a plurality of software applications over the World-Wide Web, the method comprising the steps of:
  providing a plurality of Central Processing Units (CPUs);
  providing a memory coupled to the plurality of CPUs;
  executing at least one of the plurality of web browsers residing in the memory by at least one of the plurality of CPUs;
  providing a web server application residing in the memory and being executed by at least one of the plurality of CPUs;
  providing a plurality of software applications residing in the memory and being executed by at least one of the plurality of CPUs;
  providing a common gateway interface (CGI), the CGI residing in the memory and being executed by at least one of the plurality of CPUs;
  providing an application gateway residing in the memory and being executed by at least one of the plurality of CPUs;
  providing a plurality of HTML templates, each of the plurality of HTML templates including a plurality of substitution variables;
  a selected one of the plurality of web browsers initiating an access to the plurality of software applications by sending environment data and template data to the web server application, the template data specifying one of the plurality of HTML templates;
  outputting the environment data to the application gateway through the CGI;
  outputting the template data to the application gateway through the CGI;
  retrieving the specified HTML template to the application gateway for the plurality of HTML templates;
  retrieving from the plurality of software applications a plurality of values, each value corresponding to one of the plurality of substitution variables in the specified HTML template;
  inserting the plurality of values corresponding to the plurality of substitution variables into the specified HTML template;
  identifying which of the plurality of browsers should be sent the specified HTML template;
  sending the specified HTML template with the inserted plurality of values to the identified web browser.

32. The method of claim 31 wherein at least one of the plurality of software applications is a process engineering software application.

33. The method of claim 31 wherein at least one of the plurality of software applications is a workflow management software application.

34. The method of claim 31 wherein the template data comprises an HTML template including a template variable, and wherein the step of retrieving the specified HTML template comprises retrieving the specified HTML template based upon the template variable.

35. The method of claim 31 wherein the template data comprises a URL address for the specified HTML template and wherein the step of retrieving the specified HTML template comprises selecting said specified HTML template from the plurality of HTML templates.

36. A program product for communicating between a plurality of web browsers and a plurality of software applications, the program product comprising:
  (1) an application gateway in communication with a common gateway interface (CGI) and the plurality of software applications, the CGI communicating with the plurality of web browsers, the application gateway including:
    a template communication mechanism, the template communication mechanism providing, an interface with a plurality of HTML templates, each of the plurality of HTML templates including at least one input variable and a plurality of substitution variables;
    a data retrieval mechanism, wherein the data retrieval mechanism retrieves data from the plurality of software applications, the data corresponding to the plurality of substitution variables; and a variable processing mechanism, wherein the variable processing mechanism processes the data retrieved from the plurality of software applications and substitutes the data into the plurality of substitution variables in one of the plurality of HTML templates;

(2) signal bearing media bearing the application gateway.

37. The program product of claim 36 wherein the signal bearing media comprises recordable media.

38. The program product of claim 36 wherein the signal bearing media comprises transmission media.

39. A method of communicating between a web browser and a plurality of software applications over the World-Wide Web, the method comprising the steps of:

providing a client workstation running the web browser;

providing a web server computer running a web server application;

providing a first computer system running an application gateway;

providing at least one second computer system, each second computer system running at least one of the plurality of software applications;

providing a first communication mechanism between the web browser and the web server application, the first communication mechanism allowing data to be transmitted between the web browser and the web server application;

providing a common gateway interface (CGI), the CGI serving as a second communication mechanism between the web server application and the application gateway, the second communication mechanism allowing data to be transmitted between the web server application and the application gateway;

providing a plurality of third communication mechanisms between the application gateway and the plurality of software applications, each third communication mechanism allowing data to be transmitted between the application gateway and one of the plurality of software applications;

providing a plurality of HTML templates, each of the plurality of HTML templates comprising at least one input variable and a plurality of substitution variables, each substitution variable identifying one of plurality of software applications that can provide a value for the substitution variable;

the web browser initiating access to the plurality of software applications by sending authentication data, environment data, and template data to the web server application via the first communication mechanism, the template data identifying one of the plurality of HTML templates;

the web server application determining whether the authentication data authorizes the selected web browser to access the plurality of software applications;

the web server application processing the environment data if the authentication data authorizes the selected web browser to access the plurality of software applications;

the web server application outputting the processed environment data to the application gateway via the CGI;

the web server application outputting the template data to the application gateway via the CGI;

the application gateway retrieving the one of the plurality of HTML templates identified by the template data;

for each substitution variable in the retrieved HTML template, the application gateway retrieving a value from the one of the plurality of software applications identified by the substitution variable;

for each retrieved value, the application gateway inserting each retrieved value into the corresponding substitution variable in the retrieved HTML template;

the application gateway determining which of the plurality of browsers should be sent the retrieved HTML template;

the application gateway sending the retrieved HTML template to the web server application through the CGI; and the web server application sending the retrieved HTML template to the selected one web browser corresponding to the identifier via the first communication mechanism.

\* \* \* \* \*